(12) United States Patent
Itoh et al.

(10) Patent No.: US 7,264,330 B2
(45) Date of Patent: Sep. 4, 2007

(54) ULTRAVIOLET RAY CURABLE INK, INK COMPOSITION FOR INK JET AND PROCESS FOR PREPARING INK JET PRINTED MATTER USING THE SAME

(75) Inventors: Yoshikatsu Itoh, Fukui (JP); Tomoyuki Nishikawa, Fukui (JP)

(73) Assignee: Seiren Co., Ltd., Fukui-ken (JP)

( * ) Notice: Subject to any disclaimer, the term of this patent is extended or adjusted under 35 U.S.C. 154(b) by 7 days.

(21) Appl. No.: 11/272,576

(22) Filed: Nov. 9, 2005

(65) Prior Publication Data
US 2006/0127591 A1 Jun. 15, 2006

Related U.S. Application Data

(63) Continuation of application No. 10/632,360, filed on Aug. 1, 2003, now Pat. No. 7,037,952.

(30) Foreign Application Priority Data

Aug. 2, 2002 (JP) .............................. 2002-226658
Sep. 20, 2002 (JP) .............................. 2002-276030

(51) Int. Cl.
*B41J 2/01* (2006.01)
*B41J 2/015* (2006.01)
*B05D 1/00* (2006.01)
*B05D 1/26* (2006.01)

(52) U.S. Cl. .............................. 347/20; 427/466; 347/1
(58) Field of Classification Search .................... 347/1, 347/20; 427/466
See application file for complete search history.

(56) References Cited

U.S. PATENT DOCUMENTS

| H001517 H | 2/1996 | Erickson et al. |
| 6,040,357 A | 3/2000 | Murphy et al. |
| 6,300,388 B1 | 10/2001 | Verdonck et al. |
| 6,534,128 B1 | 3/2003 | Carlson et al. |
| 6,558,753 B1 | 5/2003 | Ylitalo et al. |
| 6,593,390 B1 | 7/2003 | Johnson et al. |
| 6,767,980 B2 | 7/2004 | Yurugi et al. |
| 2003/0128264 A1 | 7/2003 | Ishikawa et al. |

FOREIGN PATENT DOCUMENTS

| JP | 02-311569 | 12/1990 |
| JP | 07-330835 | 12/1995 |

*Primary Examiner*—Susan Berman
(74) *Attorney, Agent, or Firm*—Ware, Fressola, Van Der Sluys & Adolphson LLP

(57) ABSTRACT

The ink comprises a coloring component, a reactive oligomer and/or a reactive prepolymer, a reactive diluent and a photoinitiator, wherein the reactive oligomer and/or reactive prepolymer unit and the reactive diluent unit have a glass transition point of 0° to 70° C., respectively, in a polymer obtained therefrom. In the present invention, a cured film excellent in adhesion to materials and scratch resistance is obtained and image without blurring is formed in ink jet printing of the ultraviolet ray curable ink. An ultraviolet ray curable ink composition having a viscosity of 60 to 800 cps at 25° C. which comprises a coloring component, a reactive diluent, a photoinitiator and an oligomer and/or reactive prepolymer having compatibility with the reactive diluent is used. The ink composition is heated to 40° to 150° C. and applied to a recording medium and cured by ultraviolet rays.

4 Claims, No Drawings

ULTRAVIOLET RAY CURABLE INK, INK COMPOSITION FOR INK JET AND PROCESS FOR PREPARING INK JET PRINTED MATTER USING THE SAME

CROSS REFERENCE TO RELATED APPLICATIONS

This application is a continuation application of application Ser. No. 10/632,360 filed on Aug. 1, 2003, now U.S. Pat. No. 7,037,752 which claims priority from Japanese Patent applications JP-2002-226658, filed Aug. 2, 2002; and JP-2002-276030, filed Sep. 20, 2002.

BACKGROUND OF THE INVENTION

The present invention relates to ultraviolet ray curable ink which makes recording image on flexible (soft) material possible.

The present invention also relates to an ink composition and a process for preparing a printed matter by ink jet printer in which the ink composition is used. More specifically, the present invention relates to an ink composition cured by irradiating with ultraviolet ray and a process for preparing a printed matter using the ink composition.

Conventionally, various printing methods in which ultraviolet ray curable ink is used are known.

Ultraviolet ray curable ink has been attracting attention in recent years from the viewpoint of high hardness of cured film, strong adhesion to substrate, excellent fastness properties such as scratch resistance, weather resistance and peeling resistance and that image can be recorded on all kinds of base materials and organic solvents are not required.

On the other hand, however, because the cured film of the ultraviolet ray curable ink is so hard, the ultraviolet ray curable ink has a disadvantage of breaking due to lack of conformity when image is recorded on a flexible (soft) material such as film or metal foil.

Also, curing by ultraviolet ray a composition containing (meth)acrylate having a (meth)acryloyl group as a reactive prepolymer or reactive diluent has been attempted (JP-A-7-330835). When the fast curable (meth)acrylate composition of low viscosity disclosed in the publication is used for a flexible material such as film or metal foil as an ultraviolet ray curable ink, the cured film is cracked and peeled off of the material by bending.

As mentioned above, ultraviolet ray curable ink which is excellent in conformity, of which the cured film does not break even when recording is conducted on a flexible material, and also superior in scratch resistance and adhesion does not exist.

Also, recording methods utilizing ink jet printing have been widely used.

Recently the recording medium for ink jet printing is not limited to paper and image recording is conducted using various materials such as film, plastics, ceramics, metal and fabric. However, when liquid ink is used to print an image on such materials, a clear image cannot be formed as blurring occurs.

In order to solve this problem, a method of forming an ink receiving layer on the recording face of the recording material by treating in advance is suggested. However, pre-treatment is required when forming the ink receiving layer on the recording face and post-treatment of removing the ink receiving layer becomes necessary and so the method is extremely inefficient.

To solve the above problem, a printing method in which ink jet printing is conducted directly on a recording face without forming ink receiving layer by using hot melt ink has been developed. The hot melt ink used in this printing method is obtained by dissolving a coloring agent in a solvent prepared by heating and melting a vehicle which is solid (semi-solid) at room temperature. However, the biggest problem with hot melt ink is that the image formed by the hot melt ink lacks scratch resistance as wax is used as the main component of the ink.

Further, ultraviolet ray curable ink for ink jet which can produce a cured film excellent in scratch resistance even from liquid ink by irradiating with ultraviolet ray after printing has been developed. However, the ultraviolet ray curable ink has problems such as blurring occurring during the period from printing to curing by irradiating with ultraviolet ray and limited ink viscosity for stable discharge.

In order to solve these problems, JP-A-2-311569 suggests a method of printing by heating the ink prepared from photo-polymerizable monomers, thermosoftening resin and photoinitiator by decreasing the viscosity. However, in this method, the thermosoftening resin must be dispersed in the photo-polymerizable monomers and an organic solvent is used. The organic solvent evaporates when ink is heated and thus there is the problem of smell and adverse effect on health. When the thermosoftening resin is dispersed in the photo-polymerizable monomers without using any organic solvent, homogeneous dispersion tends to be difficult and after curing of ink, uniform cured film cannot be obtained.

Also, to adjust the viscosity of ink so that the ink can be discharged from the printer head, including a monomer component having a relatively low viscosity which is called a reactive diluent is possible but the cured film obtained lacks flexibility and the adhesion to materials is poor. In particular, in the case of using ultraviolet ray curable ink containing a large amount of coloring agent which is used for coloring, the exposed ultraviolet ray is difficult to reach the inside of ink and forming a firm cured film was extremely difficult.

SUMMARY OF THE INVENTION

The object of the present invention is to provide ultraviolet ray curable ink excellent in conformity, of which the cured film does not break even when recording is conducted on a flexible material and also superior in scratch resistance and adhesion.

Another object of the present invention is to provide an ink composition which can be used in an ink jet printer and cure by irradiating with ultraviolet ray or other energy sources, wherein the cured film has excellent adhesion to materials and superior scratch resistance because a firm film can be formed and an image can be formed without blurring. The present invention also provides a printed matter obtained from the ink composition.

The problems mentioned above were intensively studied focusing on the glass transition point of the polymer of the reactive oligomer and/or reactive prepolymer and the glass transition point of the polymer of the reactive diluent, which are used for ultraviolet ray curable ink. As a result, obtaining ultraviolet ray curable ink excellent in conformity, scratch resistance and adhesion was made possible by using a composition in which the glass transition point of the polymer mentioned above is within a specific range.

Further, discharging ink having a reduced viscosity was made possible by using ultraviolet ray curable ink comprising a coloring component, reactive diluent, photoinitiator and oligomer component which has compatibility with the reactive diluent, and heating by using a printer head of which the temperature can be increased.

That is, the present invention relates to ultraviolet ray curable ink comprising a coloring component, a reactive oligomer and/or reactive prepolymer, a reactive diluent and a photoinitiator, wherein the polymer of the reactive oligomer and/or reactive prepolymer and the polymer of the reactive diluent have a glass transition point of 0° to 70° C., respectively.

The difference in glass transition point of the reactive oligomer and/or reactive prepolymer and the reactive diluent is preferably within 30° C.

The present invention also relates to an ultraviolet ray curable ink composition comprising a coloring component, a reactive diluent, a photoinitiator and a reactive oligomer and/or reactive prepolymer which has compatibility with the reactive diluent, wherein the ink composition has a viscosity of 60 to 800 cps at 25° C.

The reactive oligomer and/or reactive prepolymer preferably has a viscosity of 40 to 10000 cps at 60° C.

The amount of the reactive oligomer and/or reactive prepolymer is preferably 10 to 80% by weight.

The present invention also relates to a process for preparing an ink jet printed matter, which comprises the steps of: heating the ink composition to 40° to 150° C., applying the heated ink composition to a recording medium and curing the ink composition on the recording medium by irradiating with ultraviolet ray.

DETAILED DESCRIPTION OF THE INVENTION

The present invention provides ultraviolet ray curable ink which is excellent in conformity, scratch resistance and adhesion and which provides a cured film which does not break, even when recording is conducted on a flexible material.

The ultraviolet ray curable ink of the present invention comprises a coloring component, reactive oligomer and/or reactive prepolymer, reactive diluent and photoinitiator.

The glass transition point (Tg) of the polymer comprising the reactive oligomer and/or reactive prepolymer and Tg of the polymer comprising the reactive diluent are 0° to 70° C., preferably 5° to 50° C., more preferably 10° to 30° C., respectively.

Herein Tg means the temperature at which a polymer becomes rubber-like and obtains fluidity, changing from a hard glass state as the polymer is heated. Tg is greatly influenced by bonding interaction, molecular weight, number of functional groups and chemical structure. Generally, polymer becomes hard and brittle at Tg or lower and comes to have certain strength and flexibility at Tg or higher as the molecules have fluidity.

The glass transition point (Tg) in the present invention refers to Tg of the polymer comprising the reactive oligomer and/or reactive prepolymer and Tg of the polymer comprising the reactive diluent, that is, Tg of homopolymer measured by a differential scanning calorimeter.

By using ultraviolet ray curable ink in which Tg of the polymer of the reactive oligomer and/or reactive prepolymer and Tg of the polymer of the reactive diluent is 0° to 70° C., preferably 5° to 50° C., more preferably 10° to 30° C., the scratch resistance, adhesion, flexibility and conformity to the flexible material of the cured film obtained by irradiating with ultraviolet ray become superior. When Tg is higher than 70° C., cured film of ultraviolet ray curable ink becomes too hard, losing flexibility and becomes brittle by contrast. When Tg is lower than 0° C., fastness such as scratch resistance becomes inferior and tackiness tends to develop.

The reactive oligomer and/or reactive prepolymer having a Tg of 0° to 70° C. in the polymer thereof is an essential component in the present invention and when necessary, those having a Tg which is outside the range of 0° to 70° C. can also be used. In this case, the amount of reactive oligomer and/or reactive prepolymer having a Tg outside the range of 0° to 70° C. is preferably at most 20% by weight based on the amount of the reactive oligomer and/or reactive prepolymer having a Tg of 0° to 70° C.

Any reactive diluent can be used as long as the polymer comprising the reactive diluent unit has a Tg of 0° to 70° C., preferably 5° to 50° C., more preferably 10° to 30° C. When the Tg is within the range of 0° to 70° C., printing can be conducted and the scratch resistance, adhesion, flexibility and conformity to flexible material of the cured film obtained by irradiating with ultraviolet ray becomes superior.

The reactive diluent of which Tg is 0° to 70° C. in the polymer thereof is an essential component in the present invention and when necessary, those of which Tg is outside the range of 0° to 70° C. can also be used. In this case, the amount of reactive diluent of which Tg is outside the range of 0° to 70° C. is preferably at most 20% by weight based on the amount of the reactive diluent of which Tg is 0° to 70° C.

Also, the difference in the glass transition point of the polymer of the reactive oligomer and/or reactive prepolymer and the polymer of the reactive diluent is preferably at most 30° C., more preferably at most 20° C. When the difference is more than 30° C., the property of reactive oligomer and/or reactive prepolymer or reactive diluent becomes noticeable. As a result, the cured film obtained becomes too hard and may develop tackiness.

The ultraviolet ray curable ink composition for ink jet of the present invention comprises a coloring component, a reactive oligomer and/or reactive prepolymer, a reactive diluent and a photoinitiator, and the viscosity of the ink composition at 25° C. is preferably 60 to 800 cps, more preferably 80 to 400 cps and most preferably 100 to 200 cps. When the viscosity of the ink composition at 25° C. is less than 60 cps, the reactive oligomer and/or reactive prepolymer is hardly included and sufficient scratch resistance and adhesion cannot be obtained and when the viscosity is more than 800 cps, the viscosity of ink does not decrease sufficiently when heated and the dischargeability of ink is inferior. The viscosity at 60° C. is preferably 5 to 80 cps.

The reactive oligomer and/or reactive prepolymer in the ultraviolet ray curable ink and ultraviolet ray curable ink composition for ink jet of the present invention is a polymer in which the repeat of the monomer is 2 to about 20 and which has a 2 to 6 double bond reactive groups at the molecular terminal. Examples of the reactive oligomer and/or reactive prepolymer are urethane acrylate, polyester acrylate, epoxy acrylate, silicone acrylate and polybutadiene acrylate and these may be used alone or in a combination thereof.

The reactive oligomer and/or reactive prepolymer has a smaller number of cross-linking points compared to monomers and when used in the ultraviolet ray curable ink composition, a cured film improved in strength and adhesion can be prepared by irradiating with ultraviolet ray.

Among the reactive oligomer and/or reactive prepolymers mentioned above, urethane acrylate is preferable from the viewpoint of excellent adhesion to various materials, toughness, flexibility, chemical resistance and low temperature properties.

Urethane acrylate is high in viscosity compared to other reactive oligomer and/or reactive prepolymers and therefore has been used only in a small amount in the conventional ink. In the present invention, however, as ink can be heated for use, urethane acrylate can be added in a large amount. In view of the melt viscosity when heated, the amount of urethane acrylate added is preferably 10 to 60% by weight in the ink composition and adjusted to any amount within the range considering adhesion to materials, flexibility and scratch resistance of the cured film.

The number of functional groups in the reactive oligomer and/or reactive prepolymer molecule is preferably two. When the number of the functional groups is large in the ink components, the number of crosslinking points in the cured film increases and the cured film obtained becomes hard. However, the adhesion and scratch resistance of the film tends to be inferior. For this reason, the number of functional groups is preferably small and especially two, in that the molecules do not form a continuous film unless each of the molecules contains at least two functional groups.

Further, regarding the reactive oligomer and/or reactive prepolymer, one which can be completely mixed with the reactive diluent mentioned below is selected from the viewpoint of ensuring stability when heating ink and forming a uniform cured film.

The reactive oligomer and/or reactive prepolymer used in the present invention preferably has a viscosity at 60° C. of 40 to 10000 cps, more preferably 40 to 7000 cps. When the viscosity at 60° C. of reactive oligomer and/or reactive prepolymer is less than 40 cps, the molecular weight of the reactive oligomer and/or reactive prepolymer is expected to be insufficient and therefore the scratch resistance and adhesion of the cured film obtained therefrom tends to be inferior. When the viscosity is more than 10000 cps, the amount to be added in the ink is limited to a very small amount and the reactive diluent becomes predominant in the ink components and therefore the scratch resistance and adhesion of the cured film tends to be inferior.

The amount of reactive oligomer and/or reactive prepolymer is preferably 10 to 80% by weight, more preferably 10 to 60% by weight within the ink composition. When the amount of reactive oligomer and/or reactive prepolymer is less than 10% by weight, the reactive diluent becomes predominant in the ink components and therefore the scratch resistance and adhesion of the cured film tends to be insufficient. When the amount of reactive oligomer and/or reactive prepolymer is more than 80% by weight, there is the disadvantage that the viscosity of the ink is too high to be injected.

The reactive diluent in the ultraviolet ray curable ink and the ultraviolet ray curable ink composition for ink jet of the present invention is a monomer which has at least one double bond reactive group at the molecule terminal. Examples thereof are monofunctional caprolactone acrylate, tridecyl acrylate, isodecyl acrylate, isooctyl acrylate, isomiristyl acrylate, isostearyl acrylate, 2-ethylhexyl-diglycol acrylate, 2-hydroxybutyl acrylate, 2-acryloyloxyethyl hexahydrophthalic acid, neopentyl glycol acrylic acid benzoic acid ester, isoamylacrylate, lauryl acrylate, stearyl acrylate, butoxyethyl acrylate, ethoxy-diethylene glycol acrylate, methoxy-triethylene glycol acrylate, methoxy-polyethylene glycol acrylate, methoxydipropyleneglycol acrylate, phenoxyethyl acrylate, phenoxy-polyethylene glycol acrylate, nonylphenol ethylene oxide adduct acrylate, tetrahydrofurfuryl acrylate, isobonyl acrylate, 2-hydroxyethyl acrylate, 2-hydroxypropyl acrylate, 2-hydroxy-3-phenoxypropyl acrylate, 2-acryloyloxyethyl succinic acid, 2-acryloyloxyethylphthalic acid and 2-acryloyloxyethyl-2-hydroxyethylphthalic acid; difunctional hydroxypivalic acid neopentylglycol diacrylate, polytetramethylene glycol diacrylate, trimethylol propane acrylic acid benzoic acid ester, diethylene glycol diacrylate, triethylene glycol diacrylate, tripropylene glycol diacrylate, tetraethylene glycol diacrylate, polyethylene glycol (200) diacrylate, polyethylene glycol (400) diacrylate, polyethylene glycol (600) diacrylate, polyethylene glycol (1000) diacrylate, polypropylene glycol (400) diacrylate, polypropylene glycol (700) diacrylate, neopentyl glycol diacrylate, 1,3-butanediol diacrylate, 1,4-butanediol diacrylate, 1,6-hexanediol diacrylate, 1,9-nonanediol diacrylate, dimethylol-tricyclodecane diacrylate, bisphenol A ethylene oxide adduct diacrylate and bisphenol A propyleneoxide adduct diacrylate; trifunctional trimethylolpropane triacrylate, ethylene oxide modified trimethyl propane triacrylate, ethylene oxide modified trimethylolpropane triacrylate, pentaerythritol triacrylate, tris(2-hydroxyethyl)isocyanurate triacrylate and propoxylated glyceril triacrylate; tetrafunctional pentaditrimethylol propane tetraacrylate, ethoxylated pentaerythritol tetraacrylate, pentaerythritol tetraacrylate; pentafunctional dipentaerythritol hydroxypentaacrylate; and hexafunctional dipentaerythritol hexaacrylate; and modifications thereof. These can be used alone or in a combination.

The reactive diluent, as well as the reactive oligomer and/or reactive prepolymer, is preferably a difunctional group compound. This is because when the number of functional groups in the ink component is large, the cured film becomes hard as the crosslinking points increase but becomes brittle by contrast and the adhesion and scratch resistance tends to be inferior.

The number of functional groups is preferably small from the reason mentioned above and the dilution property of the ink and is especially two, considering that the molecules cannot form a continuous film unless each of the molecules contains at least two functional groups.

Among the difunctional reactive diluents, when ink jet method is employed as the recording method, tetraethylene glycol diacrylate, polyethylene glycol (400) diacrylate, polyethylene glycol (600) diacrylate, polypropylene (400) diacrylate, polypropylene (700) diacrylate are more preferable from the viewpoint that the viscosity is relatively low.

In the case of using ethylene oxide and propylene oxide adduct, the number of moles when polymerizing can be selected randomly.

In addition to the above reactive diluent, a reactive diluent having a functional group such as phosphorus and fluorine can also be added in order to improve adhesion and impart water repellency and oil repellency.

The amount of reactive diluent is preferably 10 to 90% by weight, more preferably 40 to 80% by weight in the ink composition. When the amount of reactive diluent is less than 10% by weight, the viscosity of ink may not decrease sufficiently and as the reactive oligomer and/or prepolymer becomes predominant in the ink components, sudden change in viscosity may occur due to a small change in temperature. Moreover, in some cases the ink comes to have a non-Newton fluid property, causing nozzle clogging and satellite, which is not good for discharge. When the amount of reactive diluent is more than 90% by weight, as the reactive diluent becomes predominant in the ink components, the scratch resistance and adhesion of the obtained cured film tends to be inferior.

The photoinitiator used in the ultraviolet ray curable ink and the ultraviolet ray curable ink composition for ink jet of the present invention is benzoin type, thioxanthone type, benzophenone type, ketal type and acetophenone type. These can be used alone or in a combination.

Examples of the photoinitiators are 2,2-dimethyl-2-hydroxy-acetophenone, 1-hydroxy-1-cyclohexyl-phenylketone, 2,2-dimethoxy-2-phenylacetophen-one, 2-benzyl-2-dimethylamino-1-(4-morpholinophenyl)-butane-1-one, 1-methyl-i-{4-methylthiolphenyl}-2-morpholino-propane-1-one, 2,4,6-trimethylbenzyl-diphenyl-phosphine oxide, 1-chloro-4-propoxythioxan-thone, isoprorylthioxanthone (mixture of 2- and 4-isomer), benzophenone, a blend of bis(2,6-dimethoxybenzoyl)-2,4,4-trimethylpentyl phosphine oxide and 1-phenyl-2-hydroxy-2-hydroxy-2-methylpropanone, a blend of bis(2,6-dimethoxybenzoyl)-2,4,4-trimethylpentyl phosphine oxide and 1-hydroxy-cyclohexyl-phenyl ketone, bis(2,4,6-trimethylbenzoyl)phenylphoxphine oxide and camphor quinone.

Of these, a photoinitiator which has compatibility with both the reactive ligomer and/or prepolymer and reactive diluent, has a reduced odor and does not react with natural light is preferable.

The amount of the photoinitiator is preferably 0.1 to 10% by weight in the ink composition. In order to advance the initiating reaction of the photoinitiator, auxiliaries such as a sensitizer can also be used.

Both pigment and dye can be used as the coloring component used in the ultraviolet ray curable ink and the ultraviolet ray curable ink composition for ink jet of the present invention. Pigment is preferred when the recorded material to which printing is conducted requires weatherability and light resistance and any one of organic or inorganic pigment can be used. [Examples of the organic pigments are nitroso pigments, dying lake pigments, azo lake pigments, insoluble azo pigments, monoazo pigments, diazo pigments, condensed azo pigments, benzoimidazoron pigments, phthalocyanine pigments, anthraquinone pigments, perylene pigments, quinacridone pigments, dioxane pigments, isoindorin pigments, azomethine pigments and pyrrolopyrrole pigments.

Examples of the inorganic pigments are oxides, hydroxides, sulfides, ferrocyanides, chromates, sulfates, carbonates, silicates, phosphates, carbons (carbon black) and metal powders.

When weatherability and light resistance are not a priority, a dye can be used and in that case any dye can be used without particular limitation.

Examples of the dye are oil dye, dispersion dye, acidic dye, reactive dye, cationic dye and direct dye such as azo dye, anthraquinone dye, indigoide dye, phthalocyanine dye, carbonium dye, quinone imine dye, methine dye, xanethene dye, nitro dye and nitroso dye.

When in demand, dispersions, heat stabilizers, antioxidants, antiseptics, defoaming agents and penetrants may also be added to the ultraviolet ray curable ink and the ultraviolet ray curable ink composition for ink jet of the present invention.

The ultraviolet ray curable ink and the ultraviolet ray curable ink composition for ink jet of the present invention can be obtained by mixing a coloring component, reactive diluent, photoinitiator, reactive oligomer and/or prepolymer and if necessary a resin and other additives and by dispersing the mixture using a dispersing apparatus such as a roll mill, ball mill, colloid mill, jet mill and bead mill and then filtrating.

When recording an image on a flexible material using the ultraviolet ray curable ink of the present invention, letterpress printing, surface printing, gravure printing, screen printing and ink jet printing may be employed.

Of these, ink jet printing which can produce fine pictures and achieve small rot processing, which was difficult with the conventional printing, is preferable.

The ink jet printing machine using ultraviolet ray curable ink is not particularly limited. The viscosity of ink discharged is preferably 1 to 100 cps, more preferably 5 to 50 cps.

The ink may be discharged after reducing the viscosity by heating with a heating means installed in the head used in the ink jet method. As the ink can be heated in this system, a large amount of reactive oligomer and/or prepolymer can be added. In consideration of the melt viscosity when heated, the amount of reactive oligomer and/or prepolymer is preferably 10 to 60% by weight and can be randomly changed within the range considering adhesion and conformity to the material, and scratch resistance of the cured film.

The ink jet printing machine using ultraviolet ray curable ink which can be heated is not particularly limited. A heating means may be installed in the head of a usual ink jet printer to reduce the viscosity by heating. The heating temperature is room temperature to 150° C., preferably 30° to 70° C. and determined from the thermal curability of the reactive oligomer and/or prepolymer used, that is, the heating temperature is set lower than the point from which heat curing is initiated. The viscosity of ink discharged under a heating condition is preferably 1 to 100 cps, more preferably 5 to 50 cps.

The printing method using the ultraviolet ray curable ink composition for ink jet of the present invention is explained below.

The ink jet printing machine used for the printing method in the present invention is not particularly limited and one which has a heating means in the head of a usual ink jet printer may be used. In the printing method employed in the present invention, first the printer head is heated to increase the temperature of the ink composition of the present invention. Using at a fixed temperature by heating the printer head reduces the viscosity of the ink and discharging while maintaining this state becomes possible and discharging reliability can be improved.

The heating temperature when using the printer head in that case is 40° to 150° C., preferably 45° to 100° C. The heating temperature is determined considering the curability of the reactive oligomer and/or prepolymer used. When the heating temperature is too low, sufficient decrease in the viscosity of the ink cannot be expected and the viscosity becomes unstable. When the heating temperature is too high, polymerization advances due to the heat energy, causing thickening and collapse of the dispersion state of pigment within the resin.

Further, the viscosity of the ink in the above case is 5 to 80 cps, preferably 8 to 40 cps, more preferably 10 to 30 cps. In this viscosity range, continuous discharging ability and quality of printing are ensured as stable ink discharge becomes possible.

Generally in both aqueous and solvent type ink compositions, except for medium, a high molecular weight resin is the major component constituting the ink composition which is not for ink jet printing. The advantage is imparting flexibility to the resin film, improving adhesion and increasing film strength. The ultraviolet ray curable resin ink used in screen printing is not an exception and an oligomer and/or prepolymer which contains a reactive group in the molecule is added as the polymer material.

However, in the case of ink jet printing, such high viscosity ink cannot be discharged due to the structure of the head of the ink jet printer.

In the present invention, the temperature of the ink can be changed with ease by using a printer head which can be heated and as a result, the viscosity of the ink can be decreased.

Therefore adding a large amount of a reactive group containing oligomer or prepolymer component which lacks fluidity at room temperature becomes possible. As a larger amount of reactive oligomer or prepolymer component can be added to the ink compared to the conventional low viscosity ultraviolet ray curable ink for ink jet containing monomers as a main component, the crosslinking points in the cured film decrease and the high molecular weight material forms the basic structure and as a result, the flexibility of the cured film is improved.

Here, not only reactive oligomer or prepolymer but also the reactive diluent (special acrylate monomer) of a relatively high molecular weight can be added and this contributes to the improvement of the flexibility of the cured film.

Furthermore, as a reactive group containing oligomer or prepolymer component which lacks fluidity can be added, a wide variety of reactive oligomer and prepolymer which contains various functional groups in the molecular structure can be selected and therefore the adhesion can be improved for many kinds of materials.

Then the heated ink composition is discharged from the printer head and applied to the recording medium. Here, as the temperature of the ink decreases suddenly when the ink is spotted on the material (recording medium), thickening of the ink occurs and the ink is prevented from blurring. That is, thickening of the ink can prevent the shift between ink dots which occurs after ink is discharged and cured by irradiating with ultraviolet ray.

The ultraviolet ray curable ink and ultraviolet ray curable ink composition for ink jet applied on the recording medium are cured by irradiating with ultraviolet ray.

When irradiating with ultraviolet rays, the voltage of the ultraviolet ray lamp is preferably 30 to 280 W/cm, more preferably 50 to 280 W/cm, most preferably 120 to 200 W/cm under the condition of an irradiation height of 2 to 15 cm. When the voltage of the ultraviolet ray lamp is lower than 30 W/cm, the ink may not be cured sufficiently due to inadequate peak intensity and accumulated amount of light intensity of the ultraviolet rays. When the voltage of the ultraviolet ray lamp is higher than 280 W/cm, the flexible material (film) is deformed or melted from the heat of the ultraviolet ray lamp and the cured film of the ink tends to be damaged.

The irradiation time of ultraviolet rays is preferably 0.1 to 20 seconds, more preferably 0.5 to 10 seconds. When the irradiation time of ultraviolet rays is longer than 20 seconds, the flexible material (film) is deformed or melted from the heat of the ultraviolet ray lamp and the cured film of the ink tends to be damaged. When the irradiation time of ultraviolet rays is shorter than 0.1 second, the ink may not be cured sufficiently due to inadequate accumulated amount of light intensity of ultraviolet rays.

When irradiating with light other than ultraviolet rays, for example, visible light, the ink may not be cured because sufficient energy for initiating and advancing polymerization cannot be obtained.

Examples of the ultraviolet ray lamp used in the present invention is a metal halide lamp.

Examples of the recording medium used in the present invention are fiber, film, resin film, papers, plastics, ceramics, metals, and metal foil but not limited thereto. Of these, flexible material such as resin film, metal foil, fiber and papers are preferable for the ultraviolet ray curable ink.

Usually the recording medium is not treated when printing is conducted by using the ultraviolet ray curable ink and ultraviolet ray curable ink composition for ink jet of the present invention. However, pre-treatment such as primer treatment may be conducted when in demand.

The present invention is explained in detail based on Examples below, but not limited thereto.

EXAMPLE 1

20 parts by weight of Ebecryl 8402 (reactive oligomer: urethane acrylate, difunctional, Tg=14° C., viscosity at 60° C.: 800 cps, available from Daicel UCB Co., Ltd.) as ultraviolet ray curable ink, 73.7 parts by weight of SR-268 (reactive diluent: tetraethylene glycol diacrylate, difunctional, Tg=23° C., available from Sartomer Company), 1 part by weight of HOSTAPERM PINK E-02 (quinacridone red, available from Clariant Japan K.K.) as a coloring component, 0.3 part by weight of Flowlen DOPA-33 (modified acrylic copolymer available from Kyoeisha Chemical Co, Ltd.) as a dispersant and 5 parts by weight of Darocur 1173 (2-hydroxy-2-methyl-1-phenyl-propane-one, available from Ciba Specialty Chemicals Inc) as a photoinitiator were mixed and the mixture was dispersed by using a bead mill. Filtration was conducted to remove impurities and homogeneous magenta ultraviolet ray curable ink was obtained. The viscosity of the obtained ink was 46.7 cps at 25° C. and 13.1 cps at 60° C.

For applying ink to the recording medium and curing, an ink jet printer head and an ultraviolet ray lamp were used.

The conditions of printing and irradiation of ultraviolet ray are as described below. An acrylic film (transparent, thickness: 50 μm) was used as the material (recording medium). The scratch resistance of the cured film after printing and curing by irradiating with ultraviolet ray was measured according to the test method of JIS K5400. As a result, a favorable result of a hardness of at least H was obtained. Also, regarding adhesion, a Scotch tape peeling test was conducted and peeling did not occur. Regarding flexibility, curling test was conducted and as a result the cured film did not crack or peel off.

With respect to ink dischargeability, clogging of the nozzle was checked after discharge and clogging was not found.

[Printing Conditions]
a. Nozzle diameter: 70 μm
b. Voltage applied: 50 V
c. Pulse width: 20 μs
d. Driving Frequency: 1 kHz
e. Resolution: 180 dpi
f. Heating temperature: 60° C.

[Conditions of Irradiation of Ultraviolet Ray]
A. Lamp: metal halide lamp
B. Voltage: 120 W/cm
C. radiation time: 1 second
D. Irradiation height: 10 cm

[Scratch Resistance]
Scratch resistance test was conducted according to JIS K5400 (8.4.2. pencil hardness) and evaluation was conducted based on the following criteria.

○: No scratch. Hardness of at least H.
Δ: No scratch. Hardness is HB.
x: Scratch is found. Hardness is less than HB.

[Adhesion]

A piece of Scotch tape was put on the cured film and pulled off all at once to observe the state of adhesion.

○: Cured film remain adhered to the base material.
Δ: Crack and bubbles appeared between the base material and cured film.
x: The entire film peeled off of the base material.

[Conformity]

The flexible base material (film, metal foil) was bent and the state of cured film was observed.

○: Cured film did not crack or peel off of the base material.
Δ: Cured film cracked.
x: Cured film broke and peeled off of the base material.

EXAMPLE 2

20 parts by weight of Ebecryl 450 (reactive oligomer: polyester acrylate, hexafunctional, Tg=17° C., viscosity at 60° C.: 410 cps, available from Disel USB Co., Ltd.) as ultraviolet ray curable ink, 73.7 parts by weight of SR-268 (reactive diluent: tetraethylene glycol diacrylate, difunctional, Tg=23° C., available from Sartomer Company), 1 part by weight of HOSTAPERM PINK E-02 (quinacridone red, available from Clariant Japan K.K.) as a coloring component, 0.3 part by weight of Flowlen DOPA-33 (modified acrylic copolymer available from Kyoeisha Chemical Co, Ltd.) as a dispersant and 5 parts by weight of Darocur 1173 (2-hydroxy-2-methyl-1-phenyl-propane-one, available from Ciba Specialty Chemicals Inc) as a photoinitiator were mixed and the mixture was dispersed in the same manner as in Example 1. Filtration was conducted to remove impurities and homogeneous magenta ultraviolet ray curable ink was obtained. The viscosity of the obtained ink was 32.1 cps at 25° C. and 9.6 cps at 60° C.

For applying ink to the recording medium and curing, an ink jet printer head and an ultraviolet ray lamp were used.

The conditions of printing and irradiation of ultraviolet ray were the same as in Example 1. The scratch resistance of the cured film after printing and curing by irradiating with ultraviolet ray was measured according to the test method of JIS K5400. As a result, a favorable result of a hardness of at least H was obtained. Also, regarding adhesion, a Scotch tape peeling test was conducted and peeling did not occur. Regarding flexibility, curling test was conducted and as a result peeling did not occur though a small crack was found in the cured film.

With respect to ink dischargeability, clogging of the nozzle was checked after discharge and clogging was not found.

EXAMPLE 3

30 parts by weight of CN-981 (reactive oligomer: urethane acrylate, difunctional, Tg=22° C., viscosity at 60° C.: 6190 cps, available from Sartomer Company) as ultraviolet ray curable ink, 63.7 parts by weight of SR-268 (reactive diluent: tetraethylene glycol diacrylate, difunctional, Tg=23° C., available from Sartomer Company), 1 part by weight of HOSTAPERM PINK E-02 (quinacridone red, available from Clariant Japan K.K.) as a coloring component, 0.3 part by weight of Flowlen DOPA-33 (modified acrylic copolymer available from Kyoeisha Chemical Co, Ltd.) as a dispersant and 5 parts by weight of Darocur 1173 (2-hydroxy-2-methyl-1-phenyl-propane-one, available from Ciba Specialty Chemicals Inc) as a photoinitiator were mixed and the mixture was dispersed in the same manner as in Example 1. Filtration was conducted to remove impurities and homogeneous magenta ultraviolet ray curable ink was obtained. The viscosity of the obtained ink was 110.0 cps at 25° C. and 21.4 cps at 60° C.

For applying ink to the recording medium and curing, an ink jet printer head and an ultraviolet ray lamp were used.

The conditions of printing and irradiation of ultraviolet ray were the same as in Example 1. The scratch resistance of the cured film after printing and curing by irradiating with ultraviolet ray was measured according to the test method of JIS K5400. As a result, a favorable result of a hardness of at least H was obtained. Also, regarding adhesion, a Scotch tape peeling test was conducted and peeling did not occur. Regarding flexibility, curling test was conducted and as a result the cured film did not crack or peel off.

With respect to ink dischargeability, clogging of the nozzle was checked after discharge and clogging was not found.

Comparative Example 1

20 parts by weight of CN-965 (reactive oligomer: urethane acrylate, difunctional, Tg=-37° C., viscosity at 60° C.: 9975 cps, available from Sartomer Company), 73.7 parts by weight of SR-268 (reactive diluent: tetraethylene glycol diacrylate, difunctional, Tg=23° C., available from Sartomer Company), 1 part by weight of HOSTAPERM PINK E-02 (quinacridone red, available from Clariant Japan K.K.) as a coloring component, 0.3 part by weight of Flowlen DOPA-33 (modified acrylic copolymer available from Kyoeisha Chemical Co., Ltd.) as a dispersant and 5 parts by weight of Darocur 1173 (2-hydroxy-2-methyl-1-phenyl-propane-one, available from Ciba Specialty Chemicals Inc) as a photoinitiator were mixed and the mixture was dispersed in the same manner as in Example 1. Filtration was conducted to remove impurities and homogeneous magenta ultraviolet ray curable ink was obtained. The viscosity of the obtained ink was 73.4 cps at 25° C. and 18.5 cps at 60° C.

For applying ink to the recording medium and curing, an ink jet printer head and an ultraviolet ray lamp were used.

The conditions of printing and irradiation of ultraviolet ray were the same as in Example 1. The scratch resistance of the cured film after printing and curing by irradiating with ultraviolet ray was measured according to the test method of JIS K5400. As a result, the hardness was at most HB and scratch was observed in the cured film. Also, regarding adhesion, a Scotch tape peeling test was conducted and peeling did not occur. Regarding flexibility, curling test was conducted and as a result crack or peeling was not observed.

With respect to ink dischargeability, clogging of the nozzle was checked after discharge and clogging was not found.

Comparative Example 2

20 parts by weight of Ebecryl 8402 (reactive oligomer: urethane acrylate, difunctional, Tg=14° C., viscosity at 60° C.: 800 cps, available from Daicel UCB Co., Ltd.), 73.7 parts by weight of M-270 (reactive diluent: polypropylene glycol diacrylate, difunctional, Tg=-32° C., available from Toa Gosei Co., Ltd.), 1 part by weight of HOSTAPERM PINK E-02 (quinacridone red, available from Clariant Japan K.K.) as a coloring component, 0.3 part by weight of Flowlen DOPA-33 (modified acrylic copolymer available from Kyoeisha Chemical Co., Ltd.) as a dispersant and 5 parts by weight of Darocur 1173 (2-hydroxy-2-methyl-1-phenyl-propane-one, available from Ciba Specialty Chemicals Inc) as a photoinitiator were mixed and the mixture was dispersed in the same manner as in Example 1. Filtration was conducted to remove impurities and homogeneous magenta ultraviolet ray curable ink was obtained. The viscosity of the obtained ink was 175 cps at 25° C. and 33.5 cps at 60° C.

For applying ink to the recording medium and curing, an ink jet printer head and an ultraviolet ray lamp were used.

The conditions of printing and irradiation of ultraviolet ray were the same as in Example 1. The scratch resistance of the cured film after printing and curing by irradiating with ultraviolet ray was measured according to the test method of JIS K5400. As a result, the hardness was at most HB and scratch was observed in the cured film. Also, regarding adhesion, a Scotch tape peeling test was conducted and peeling did not occur. Regarding flexibility, curling test was conducted and as a result crack or peeling was not observed.

With respect to ink dischargeability, clogging of the nozzle was checked after discharge and clogging was not found.

Comparative Example 3

20 parts by weight of Ebecryl 8402 (reactive oligomer: urethane acrylate, difunctional, Tg=14° C., viscosity at 60° C.: 800 cps, available from Daicel UCB Co., Ltd.), 73.7 parts by weight of Light acrylate NP-A (reactive diluent: neopentyl glycol diacrylate, difunctional, Tg=117° C., available from Kyoeisha Chemical Co., Ltd.), 1 part by weight of HOSTAPERM PINK E-02 (quinacridone red, available from Clariant Japan K.K.) as a coloring component, 0.3 part by weight of Flowlen DOPA-33 (modified acrylic copolymer available from Kyoeisha Chemical Co., Ltd.) as a dispersant and 5 parts by weight of Darocur 1173 (2-hydroxy-2-methyl-1-phenyl-propane-one, available from Ciba Specialty Chemicals Inc) as a photoinitiator were mixed and the mixture was dispersed in the same manner as in Example 1. Filtration was conducted to remove impurities and homogeneous magenta ultraviolet ray curable ink was obtained. The viscosity of the obtained ink was 21.3 cps at 25° C. and 8.7 cps at 60° C.

For applying ink to the recording medium and curing, an ink jet printer head and an ultraviolet ray lamp were used.

The conditions of printing and irradiation of ultraviolet ray were the same as in Example 1. The scratch resistance of the cured film after printing and curing by irradiating with ultraviolet ray was measured according to the test method of JIS K5400. As a result, a favorable result of a hardness of at least H was obtained. Also, regarding adhesion, a Scotch tape peeling test was conducted and the cured film cracked and peeled off of the base material. Regarding flexibility, curling test was conducted and as a result the cured film cracked and peeled off of the base material.

With respect to ink dischargeability, clogging of the nozzle was checked after discharge and clogging was not found.

Regarding Examples 1 to 3 and Comparative Examples 1 to 3, the test results of scratch resistance, adhesion and conformity, Tg of the polymer of reactive oligomer and/or prepolymer and Tg of the polymer of reactive diluent are indicated in Table 1.

TABLE 1

|  | Ex. 1 | Ex. 2 | Ex. 3 | Com. Ex. 1 | Com. Ex. 2 | Com. Ex. 3 |
|---|---|---|---|---|---|---|
| Scratch resistance | ○ | ○ | ○ | x | x | ○ |
| Adhesion | ○ | ○ | ○ | ○ | ○ | x |
| Conformity | ○ | Δ | ○ | ○ | ○ | x |
| Glass transition point of polymer of reactive oligomer/prepolymer (° C.) | 14 | 17 | 22 | −37 | 14 | 14 |
| Glass transition point of polymer of reactive diluent (° C.) | 23 | 23 | 23 | 23 | −32 | 117 |

The results in Table 1 indicate that in order to fulfill the fastness properties, using reactive oligomer and/or prepolymer having a glass transition point (Tg) within the range of 0° to 70° C. and reactive diluent is preferable. The results also indicate that urethane acrylate is more preferable compared to polyester acrylate.

EXAMPLE 4

20 parts by weight of Ebecryl 270 (urethane acrylate, difunctional, Tg=−27° C., viscosity at 60° C.: 3000 cps, available from Daicel UCB Co., Ltd.) as a reactive oligomer, 73.7 parts by weight of SR-268 (tetraethylene glycol diacrylate, difunctional, Tg=23° C., available from Sartomer Company) as a reactive diluent, 1 part by weight of HOSTAPERM PINK E-02 (quinacridone red, available from Clariant Japan K.K.) as a coloring component, 0.3 part by weight of Flowlen DOPA-33 (modified acrylic copolymer available from Kyoeisha Chemical Co., Ltd.) as a dispersant and 5 parts by weight of Darocur 1173 (2-hydroxy-2-methyl-1-phenyl-propane-one, available from Ciba Specialty Chemicals Inc) as a photoinitiator were mixed and the mixture was dispersed by using a bead mill. Filtration was conducted to remove impurities and homogeneous magenta ultraviolet ray curable ink was obtained. The viscosity of the obtained ink was measured to be 91 cps at 25° C. and 13 cps at 60° C.

Next by using an ink jet printer head which can be heated and an ultraviolet ray lamp, the ink was applied to the recording medium and cured. The conditions of printing and irradiation of ultraviolet ray were the same as in Example 1. Acrylic resin plate SUMIPEX E (available from Sumitomo Chemical Industry Co., Ltd., white, thickness: 2 mm) was used as the material (recording medium).

The cured film and printed image after printing and curing by irradiating with ultraviolet ray were evaluated. The scratch resistance was measured according to the test method of JIS K5400. As a result, a favorable result of a hardness of at least H was obtained. Also, regarding adhesion, a Scotch tape peeling test was conducted and peeling did not occur. Also a sharp image was obtained. With respect to ink dischargeability, clogging of the nozzle was checked after discharge and clogging was not found.

[Blurring of Image]

The image was visually observed and evaluated according to the following criteria.

○: Image was sharp

Δ: Slightly blurred x: Terribly blurred and not formed

EXAMPLE 5

50 parts by weight of M-6500 (polyester acrylate, difunctional, Tg=40° C., viscosity at 60° C. 47 cps, available from Toa Gosei Co., Ltd.) as a reactive oligomer, 43.7 parts by weight of M-220 (tripropylene glycol diacrylate, difunctional, Tg=90° C., available from Toa Gosei Co., Ltd.) as a reactive diluent, 1 part by weight of HOSTAPERM BLUE B2G-L (phthalocyanine blue, available from Clariant Japan K.K.) as a coloring component, 0.3 part by weight of Flowlen DOPA-33 (modified acrylic copolymer available from Kyoeisha Chemical Co., Ltd.) as a dispersant and 5 parts by weight of Irgacure 907 (2-methyl-1[4-(methylthio)phenyl]-2-morpholinopropane-1-one, available from Ciba Specialty Chemicals Inc) as a photoinitiator were mixed and the mixture was dispersed by using a bead mill. Filtration was conducted to remove impurities and homogeneous blue ultraviolet ray curable ink was obtained. The viscosity of the obtained ink was measured to be 102 cps at 25° C. and 14 cps at 60° C.

Next by using an ink jet printer head which can be heated and an ultraviolet ray lamp, the ink was applied to the recording medium and cured. The conditions of printing and irradiation of ultraviolet ray were the same as in Example 4.

The evaluation was conducted in the same manner as in Example 4. As a result, regarding the scratch resistance a favorable result of a hardness of at least H was obtained. Also, regarding adhesion, a Scotch tape peeling test was conducted and peeling did not occur. Also a sharp image was obtained. With respect to ink dischargeability, clogging of the nozzle was checked after discharge in the same manner as in Example 4 and clogging was not found.

EXAMPLE 6

A homogeneous magenta ultraviolet ray curable ink was prepared in the same manner as in Example 3.

Then, using a warmable ink jet printer head and ultraviolet ray lamp, application of ink to the recording medium and curing were conducted. The conditions of printing and irradiation of ultraviolet ray and the adhered were the same as in Example 4.

Evaluation was conducted in the same manner as in Example 4 and as a result, regarding the scratch resistance of the cured film, a favorable result of a hardness of at least H was obtained. Also, regarding adhesion, a Scotch tape peeling test was conducted and peeling did not occur. Furthermore, the printed image was sharp. Also, in the same manner as in Example 4, with respect to ink dischargeability, clogging of the nozzle was checked after discharge and clogging was not found.

Comparative Example 4

1 parts by weight of Ebecryl 270 (urethane acrylate, difunctional, Tg=−27° C., viscosity at 60° C. 3000 cps, available from Daicel UCB Co., Ltd.) as a reactive oligomer, 92.7 parts by weight of SR-268 (tetraethylene glycol diacrylate, difunctional, Tg=23° C., available from Sartomer Company) as a reactive diluent, 1 part by weight of HOSTAPERM PINK E-02 (quinacridone red, available from Clariant Japan K.K.) as a coloring component, 0.3 part by weight of Flowlen DOPA-33 (modified acrylic copolymer available from Kyoeisha Chemical Co., Ltd.) as a dispersant and 5 parts by weight of Darocur 1173 (2-hydroxy-2-methyl-1-phenyl-propane-one, available from Ciba Specialty Chemicals Inc) as a photoinitiator were mixed and the mixture was dispersed by using a bead mill. Filtration was conducted to remove impurities and homogeneous magenta ultraviolet ray curable ink was obtained.

The viscosity of the obtained ink was 18 cps at 25° C. and so discharge was conducted at room temperature without heating the printer head. Irradiation of ultraviolet ray was conducted in the same manner as in Example 4 using the same ultraviolet ray lamp. Acrylic resin plate SUMIPEX E (available from Sumitomo Chemical Industry Co., Ltd., white, thickness: 2 mm) was used as the material (recording medium).

Evaluation was conducted in the same manner as in Example 4 and as a result, regarding the scratch resistance of the cured film, the hardness was B and scratching was observed. Scotch tape peeling test was conducted and the cured film cracked and peeled off of the base material. The image obtained blurred in some part and was not sharp. With respect to ink dischargeability, clogging of the nozzle was checked after discharge and clogging was not found.

The results of Examples 4, 5 and 6 and Comparative Example 4 are shown in Table 2.

TABLE 2

|  | Ex. 4 | Ex. 5 | Ex. 6 | Com. Ex. 4 |
|---|---|---|---|---|
| Reactive oligomer/prepolymer |  |  |  |  |
| Ebecryl 270 | 20.0 |  |  | 1.0 |
| M-6500 |  | 50.0 |  |  |
| CN-981 |  |  | 30.0 |  |
| Reactive diluent |  |  |  |  |
| SR-268 | 73.7 |  | 63.7 | 92.7 |
| M-220 |  | 43.7 |  |  |
| Photoinitiator |  |  |  |  |
| Darocur 1173 | 5.0 |  | 5.0 | 5.0 |
| Irgacure 907 |  | 5.0 |  |  |
| Pigment |  |  |  |  |
| HOSTARPERM PINK E-02 | 1.0 |  | 1.0 | 1.0 |
| HOSTARPERM BLUE B2G-L |  | 1.0 |  |  |
| Others |  |  |  |  |
| Flowlen DOPA-33 | 0.3 | 0.3 | 0.3 | 0.3 |
| Viscosity (cps/° C.) | 13/60 | 14/60 | 21.4/60 | 18.25 |
| Dischargeability | ○ | ○ | ○ | ○ |
| Scratch resistance | ○ | ○ | ○ | x |
| Adhesion | ○ | ○ | ○ | x |
| Blurring of image | ○ | ○ | ○ | x |

According to the present invention, ultraviolet ray curable ink excellent in conformity, of which the cured film does not break even when recording is conducted on a flexible material and also superior in scratch resistance and adhesion can be obtained.

According to the ultraviolet ray curable ink composition of the present invention, a reactive oligomer and reactive prepolymer can be added to the ink composition in a large amount and the cured film obtained is excellent in flexibility, strength and adhesion to the material. Furthermore, as a printed matter is obtained by discharging ink in a stable condition of reduced viscosity using a printer head which can be heated, irradiating with ultraviolet ray to cure, blurring of image does not occur.

What is claimed is:

1. A process for preparing an ink jet printed matter, comprising the steps of:

heating an ink composition to between 40° and 150° C., said ink composition comprising a coloring component, a reactive diluent, a photoinitiator, and a reactive oligomer and/or a reactive prepolymer, wherein a polymer of said reactive oligomer and/or a polymer of said reactive prepolymer has a glass transition point between 0° and 70° C., and a polymer of said reactive diluent has a glass transition point between 0° and 70° C. and the difference in the glass transition point of said polymer of said reactive oligomer and/or reactive prepolymer and said polymer of said reactive diluent is at most 30° C., discharging the heated ink composition from a printer head to a recording medium comprising a flexible material, and curing the ink composition on the recording medium by irradiating with ultraviolet ray.

2. The process of claim 1, wherein said ink composition has a viscosity of 1 to 100 cps while discharging the heated ink composition from the printer head to the recording medium.

3. The process of claim 1, wherein said ink composition has a viscosity of 5 to 80 cps at 60° C.

4. The process of claim 1, wherein said reactive oligomer and/or reactive prepolymer is contained in the ink composition in an amount of 10 to 80% by weight based on the amount of the ink composition.

* * * * *

UNITED STATES PATENT AND TRADEMARK OFFICE
CERTIFICATE OF CORRECTION

PATENT NO. : 7,264,330 B2
APPLICATION NO. : 11/272576
DATED : September 4, 2007
INVENTOR(S) : Itoh et al.

It is certified that error appears in the above-identified patent and that said Letters Patent is hereby corrected as shown below:

In column 1, line 11, "7,037,752" should be --7,037,952--.

Signed and Sealed this

Twenty-ninth Day of April, 2008

JON W. DUDAS
*Director of the United States Patent and Trademark Office*